(12) United States Patent
Weast

(10) Patent No.: US 12,160,642 B2
(45) Date of Patent: Dec. 3, 2024

(54) PRESENTING ADVERTISEMENTS DURING MEDIA CONTENT SEEK

(71) Applicant: Tahoe Research, Ltd., Dublin (IE)

(72) Inventor: John Jack Weast, Portland, OR (US)

(73) Assignee: Tahoe Research, Ltd., Dublin (IE)

( * ) Notice: Subject to any disclaimer, the term of this patent is extended or adjusted under 35 U.S.C. 154(b) by 496 days.

(21) Appl. No.: 16/673,164

(22) Filed: Nov. 4, 2019

(65) Prior Publication Data

US 2020/0413153 A1    Dec. 31, 2020

Related U.S. Application Data

(63) Continuation of application No. 16/106,807, filed on Aug. 21, 2018, now Pat. No. 10,484,756, which is a continuation of application No. 15/463,748, filed on Mar. 20, 2017, now Pat. No. 10,057,656, which is a continuation of application No. 14/129,643, filed as
(Continued)

(51) Int. Cl.
| | |
|---|---|
| H04N 21/234 | (2011.01) |
| H04N 5/76 | (2006.01) |
| H04N 21/2387 | (2011.01) |
| H04N 21/242 | (2011.01) |
| H04N 21/2543 | (2011.01) |
| H04N 21/43 | (2011.01) |
| H04N 21/431 | (2011.01) |
| H04N 21/433 | (2011.01) |
| H04N 21/439 | (2011.01) |
| H04N 21/44 | (2011.01) |
| H04N 21/4402 | (2011.01) |
| H04N 21/6587 | (2011.01) |
| H04N 21/81 | (2011.01) |
| H04N 21/8549 | (2011.01) |

(52) U.S. Cl.
CPC ............. *H04N 21/812* (2013.01); *H04N 5/76* (2013.01); *H04N 21/23418* (2013.01); *H04N 21/23424* (2013.01); *H04N 21/2387* (2013.01); *H04N 21/242* (2013.01); *H04N 21/4302* (2013.01); *H04N 21/4333* (2013.01); *H04N 21/44008* (2013.01); *H04N 21/440236* (2013.01); *H04N 21/6587* (2013.01); *H04N 21/8549* (2013.01)

(58) Field of Classification Search
None
See application file for complete search history.

(56) References Cited

U.S. PATENT DOCUMENTS

| | | | |
|---|---|---|---|
| 2003/0185541 A1* | 10/2003 | Green | H04N 5/76 386/346 |
| 2008/0162451 A1* | 7/2008 | Garrison | G06F 16/434 707/999.005 |
| 2010/0166389 A1* | 7/2010 | Knee | H04N 5/76 725/32 |

* cited by examiner

Primary Examiner — Brian T Pendleton
Assistant Examiner — Jean D Saint Cyr
(74) Attorney, Agent, or Firm — Studebaker & Brackett PC

(57) ABSTRACT

Technologies for presenting an advertisement on a media consumption device includes receiving a request to seek past a commercial included in media content played on the media consumption device, determining an advertisement based on the commercial, and presenting the advertisement to a user of the media consumption device during performance of the requested seek function. The advertisement may be, for example, an extracted frame or image of the commercial and may include a logo or phrase associated with a product or service advertised in the commercial. Similar technologies related to a media content distribution system are also disclosed.

30 Claims, 6 Drawing Sheets

Related U.S. Application Data application No. PCT/US2013/051329 on Jul. 19, 2013, now Pat. No. 9,602,885.

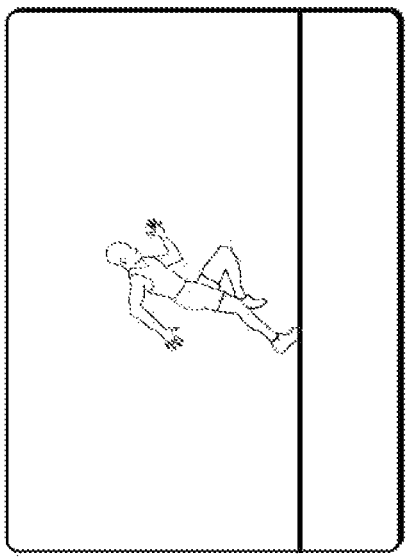
FIG. 6A
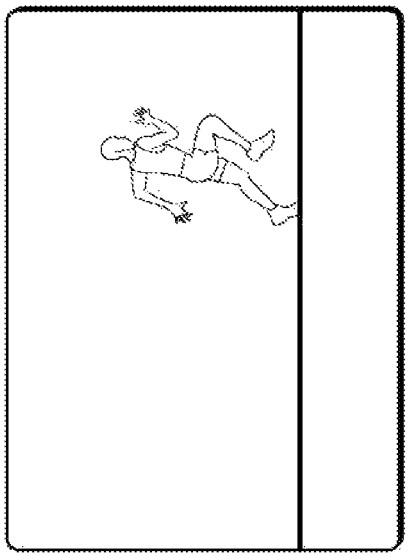
FIG. 6B
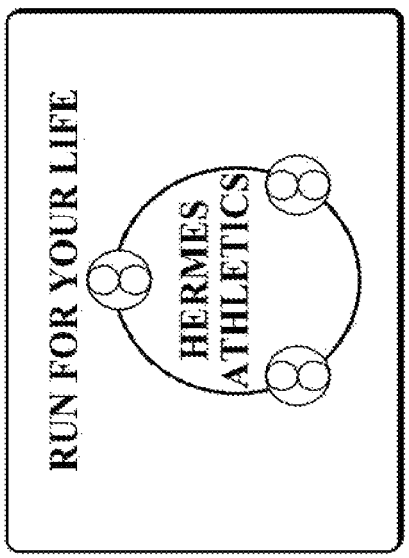
FIG. 6C
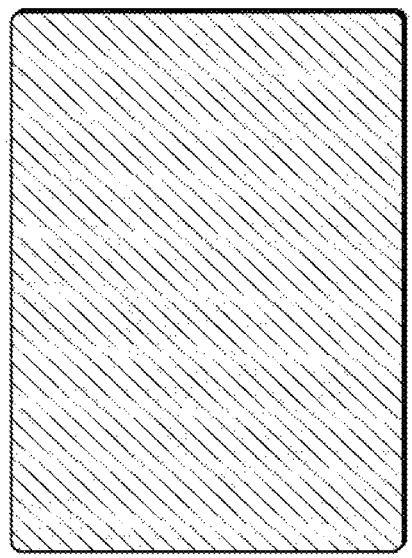
FIG. 6D
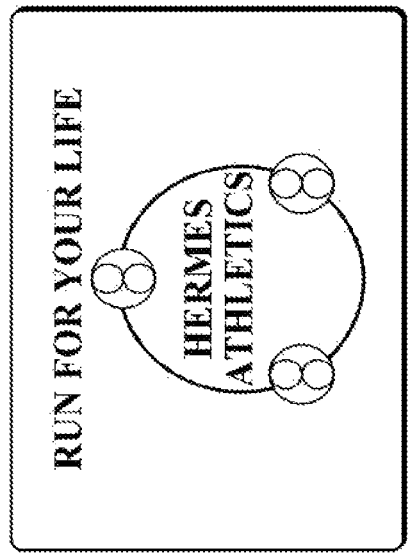
FIG. 6E
FIG. 6F

PRESENTING ADVERTISEMENTS DURING MEDIA CONTENT SEEK

CROSS-REFERENCE TO RELATED APPLICATION

The present application is a continuation application of U.S. application Ser. No. 16/106,807 entitled "PRESENTING ADVERTISEMENTS DURING MEDIA CONTENT SEEK," which was filed on Aug. 21, 2018, issued as U.S. Pat. No. 10,484,756, on Nov. 19, 2019, and is a continuation application of U.S. application Ser. No. 15/463,748, entitled "PRESENTING ADVERTISEMENTS DURING MEDIA CONTENT SEEK," which was filed on Mar. 20, 2017, issued as U.S. Pat. No. 10,057,656, on Aug. 21, 2018, and is a continuation application of U.S. application Ser. No. 14/129,643, entitled "PRESENTING ADVERTISEMENTS DURING MEDIA CONTENT SEEK," which was filed on Dec. 27, 2013, issued as U.S. Pat. No. 9,062,885 on Mar. 21, 2017, and is a national stage entry 35 USC § 371(b) of International Application No. PCT/US2013/51329, filed on Jul. 19, 2013.

BACKGROUND

Advertisements are an important marketing tool for many companies. In fact, companies often spend a significant portion of their marketing budget on advertisements. Television and other visual media advertisements are a popular advertisement vehicle that can allow a company to connect with their target audience. Many visual media advertisements include brand imagery, such as a brand name, logo, or slogan, of the company or the company's product. The use of repeated, constant brand imagery can establish a strong product identity and trademark for the company.

While advertisements are important to companies for marketing their products or services, some consumers may be ambivalent about such advertisements due to various reasons, including disinterest in the company or advertised product, over-exposure to the advertisement or product, extreme interest in the associated media content, lack of time, and/or other factors. With the advent of digital video recorders (DVRs) and related technology, end users may now seek past the commercials included in previously recorded or streamed media content (e.g., shows, movies, videos, etc.) in a high frame rate fashion. Currently, users cannot immediately or automatically skip over commercials embedded in such media content; however, the use of high-frame rate seeking allows the end users to quickly move past the commercials and to the next segment of the show or movie. Because the advertisements are shown at such a fast frame rate (or even parsed frames), the advertisements are not easily viewable or even discernible by the end user. As such, the value of the advertisements to the advertising companies is greatly diminished during media content seeking.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 6A-6F are frames of an illustrative commercial on which the method of FIGS. 3 and 4 may be applied.

DETAILED DESCRIPTION OF THE DRAWINGS

Figure 1:
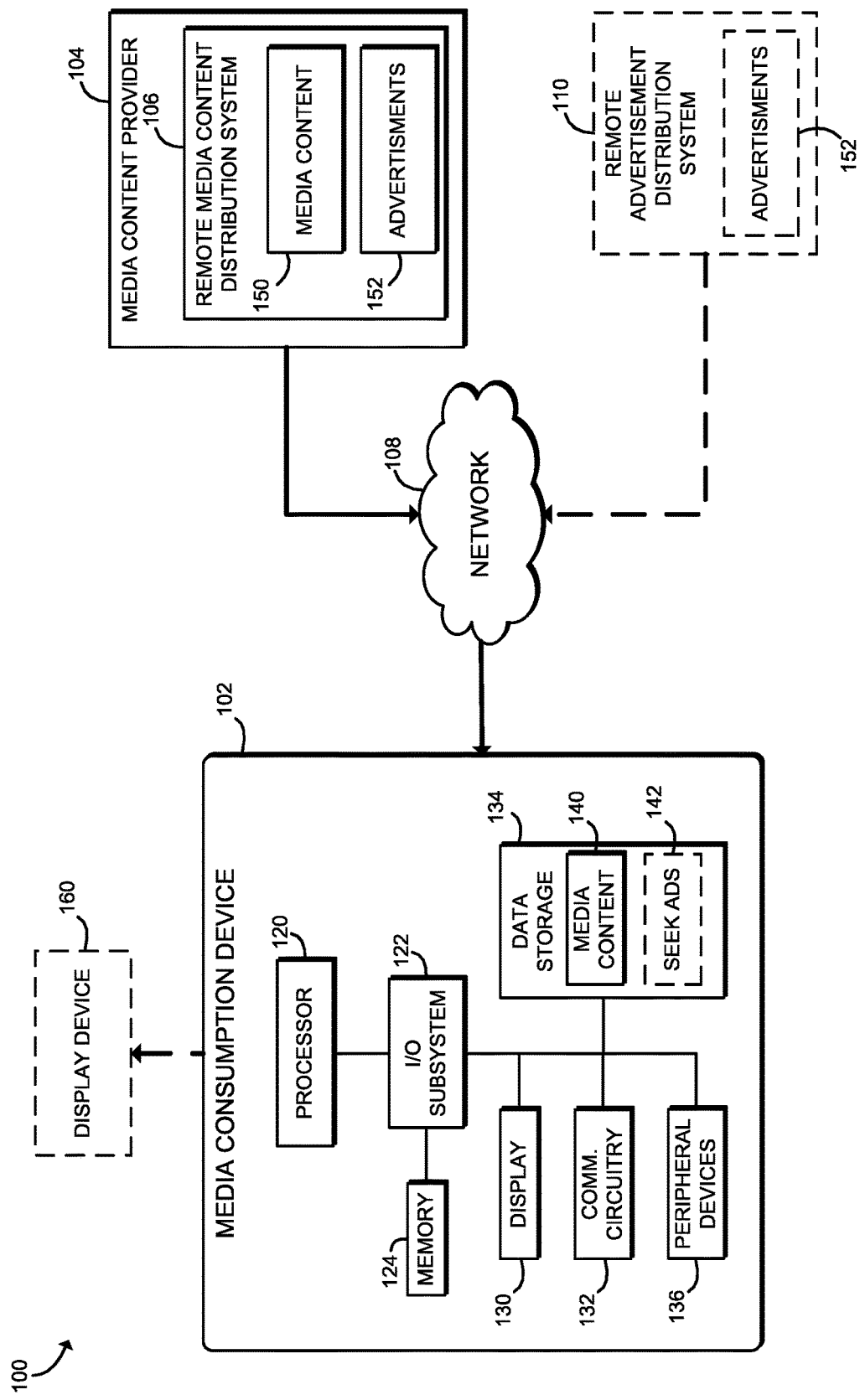
FIG. 1 is a simplified block diagram of at least one embodiment of a system for displaying advertisements during a media content seek.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for presenting advertisements to a user during performance of a media content seek includes a media consumption device 102 and one or more media content providers 104, which may communicate with the media consumption device 102 over a network 108. In use, the media consumption device 102 may obtain media content from a remote media provider 104, or other media source, and present the media content to a user of the media consumption device 102 (e.g., display the media content on a display device). A user may operate the media consumption device 102 to initiate playback of the media content and/or perform other control functions. For example, the user may operate the media consumption device 102 to seek past a commercial included in the media content such that the user is not required to view, or otherwise experience, the commercial in its entirety. In response to, or prior to, the seek request, the media consumption device 102 (or, in some embodiments, a remote media content distribution system 106 of the remote content provider 104) is configured to determine an advertisement based on the commercial itself and present the advertisement to the user of the media consumption device 102 during the performance of the requested seek function as discussed in more detail below.

The media consumption device 102 may utilize any suitable methodology to determine, generate, or otherwise select the advertisement to be presented during the requested seek functionality. For example, in some embodiments, the media consumption device 102 may extract a frame, image, or audio snippet from the commercial itself. As discussed in more detail below, the frame, image, or audio snippet may be selected to ensure that the advertiser's brand, logo, or phrase is captured in the advertisement (e.g., a frame of the commercial showing the advertiser's slogan or logo). In other embodiments, the media consumption device 102 may receive the advertisement as metadata or other out-of-band data with the media content from a remote media content distribution system 106 or a separate remote advertisement distribution system 110. Regardless, the media consumption device 102 presents the advertisement to the user while contemporaneously performing the seek function. In this way, the advertiser of the commercial can be assured that the user is exposed to their branded image, logo, or slogan even while the user is seeking past the commercial itself. Conversely, in a typical media consumption device, a user is generally allowed to fast forward past a commercial at such a high frame rate that the commercial is practically unviewable by the user. As such, the impact of the commercial on the user is greatly reduced, and the commercial spot is of less value to the advertiser.

The media consumption device 102 may be embodied as any type of computing device on which, or via which, media content may be presented or otherwise consumed. For example, the media consumption device 102 may be embodied as a set-top-box, a digital media adapter, a digital media extender, a digital media streamer, a digital media hub, a digital recorder, a "smart" television or appliance, a smartphone, a tablet computer, a notebook computer, a laptop or other mobile computer, a desktop computer, or other computing device. As shown in FIG. 1, the illustrative media consumption device 102 includes a processor 120, an input/output subsystem 122, a memory 124, a display 130, a communication circuit 132, a data storage device 134, and one or more peripheral devices 136. Of course, the media consumption device 102 may include other or additional components, such as those commonly found in a media consumption device or other computing device (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the media consumption device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the media consumption device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the media consumption device 102, on a single integrated circuit chip.

The display 130 of the media consumption device 102 may be embodied as any type of display capable of displaying digital information such as a liquid crystal display (LCD), a light emitting diode (LED), a plasma display, a cathode ray tube (CRT), or other type of display device. In some embodiments, the display 130 may be coupled with a touch screen to facilitate user interaction. Although the illustrative media consumption device 102 includes the display 130 (e.g., incorporated therein), it should be appreciated that the media consumption device 102 may be communicatively coupled to a separate display device 160 in some embodiments. In such embodiments, the media consumption device 102 may or may not include the display 130. For example, in embodiments in which the media consumption device 102 is embodied as a set-top-box or digital media adapter, the media consumption device 102 may be coupled to a separate display device 160 such as a video monitor or television.

The communication circuit 132 of the media consumption device 102 may be embodied as any communication circuit, device, or collection thereof, capable of enabling communications between the media consumption device 102 and the remote media content distribution system 106 and/or the remote advertisement distribution system 110 via the network 108. The communication circuit 132 may be configured to use any one or more communication technology (e.g., wireless or wired communications) and associated protocols (e.g., Ethernet, Bluetooth®, Wi-Fi®, WiMAX, etc.) to effect such communication.

The data storage device 134 may be embodied as any type of device or devices configured for short-term or long-term storage of data such as, for example, memory devices and circuits, memory cards, hard disk drives, solid-state drives, or other data storage devices. In some embodiments, the media consumption device 102 may store media content 140, or a portion of the media content 140, in the data storage 134. For example, in some embodiments, the media consumption device 102 may be configured to automatically record media content received from the remote media content distribution system 106 (e.g., when the user is away or at odd broadcast/streaming times). Additionally, as discussed in more detail below, the media consumption device 102 may receive seek advertisements 142 (i.e., advertisements for presentation during the performance of a requested media content seek function) from the remote media content distribution system 106 and/or the remote advertisement distribution system 110 in some embodiments. In such embodiments, the media consumption device 102 may also store the seek advertisements 142 in the data storage 134.

In some embodiments, the media consumption device 102 may further include one or more peripheral devices 136. Such peripheral devices 136 may include any type of peripheral device commonly found in a server computing device such as a hardware keyboard, input/output devices, peripheral communication devices, and/or other peripheral devices.

As discussed above, the media consumption device 102 may receive, or otherwise obtain, media content from one or more media content providers 104. The media content provider 104 may be embodied as any type of content provider including, but not limited to, a multichannel video programming distributor (MVPD) configured to provide pay-for or free video programming services to viewers via the network 108, television broadcast network configured to transmit television shows to viewers over-the-air and/or via the network 108, online media content providers configured to transmit media content over data networks of the network 108, and/or other content providers.

Each media content provider may operate one or more remote media content distribution systems 106. The remote media content distribution systems 106 may be embodied as any device, collection of devices, or system configured to distribute media content to the media consumption device. The particular structure of each remote media content distribution system 106 may be dependent on the type of media content provider 104 operating the particular remote media content distribution system 106. For example, in the case of an online media content provider, the associated remote media content distribution system 106 may be embodied as a data server or collection of data servers. As such, the remote media content distribution system 106 may include components, such as a processor, memory device, communication circuitry, and data storage, similar to the components of the media consumption device 102, the description of each of which is equally applicable to such components of the remote media content distribution system 106. Additionally or alternatively, in those embodiments in which the media content provider 104 is embodied as a multichannel video programming distributor, the remote media content distribution system 106 may include various media servers, satellites, cable TV systems, air broadcast systems, and/or additional devices, structures, subsystems, and networks.

Regardless of the particular structure, each remote media content distribution system 106 may store and manage various media content 150, the type and volume of which may depend on the content provider operating the remote media content distribution system 106. For example, in embodiments in which the remote media content distribution system 106 is operated by a television broadcast network, the media content may include shows, movies, news, and/or similar content. Additionally, in some embodiments as discussed in more detail below, the remote media content distribution system 106 may be configured to determined or generate seek advertisements 152 in addition to or alternatively to the media consumption device 102. In such embodiments, the remote media content distribution system 106 may store the advertisements 152 locally and transmit the advertisements 152 to the media consumption device 102 in association with the media content 150.

In some embodiments, the system 100 may further include a remote advertisement distribution system 110. In such embodiments, the seek advertisements 152 may be determined and/or generated by the remote advertisement distribution system 110 in addition to, or alternatively to, the media consumption device 102 and/or the remote media content distribution system 106. In use, as discussed in more detail below, the media consumption device 102 may communicate with the remote advertisement distribution system 110 to request and/or retrieve the seek advertisements 152 as needed.

Although the illustrative system 100 of FIG. 1 includes only one media content provider 104 and one remote advertisement distribution system 110, it should be appreciated that the system 100 may include additional media content providers 104 and/or remote advertisement distribution systems 110 in other embodiments. Additionally, although the media content provider 104 of is shown in FIG. 1 has including a single remote media content distribution system 106, each media content provider 104 may include multiple remote media content distribution systems 106 in other embodiments. As such, the system 100 may include multiple remote media distributions systems 106 operated by one or more media content providers 104 in some embodiments.

The network 108 may be embodied as any type of communication network capable of facilitating communication between the media consumption device 102 and the remote media content distribution system 106. As such, the network 108 may include one or more networks, routers, switches, computers, and/or other intervening devices. For example, the network 108 may be embodied as or otherwise include one or more local or wide area networks, cellular networks, publicly available global networks (e.g., the Internet), an ad hoc network, a short-range communication network or link, or any combination thereof.

Figure 2:
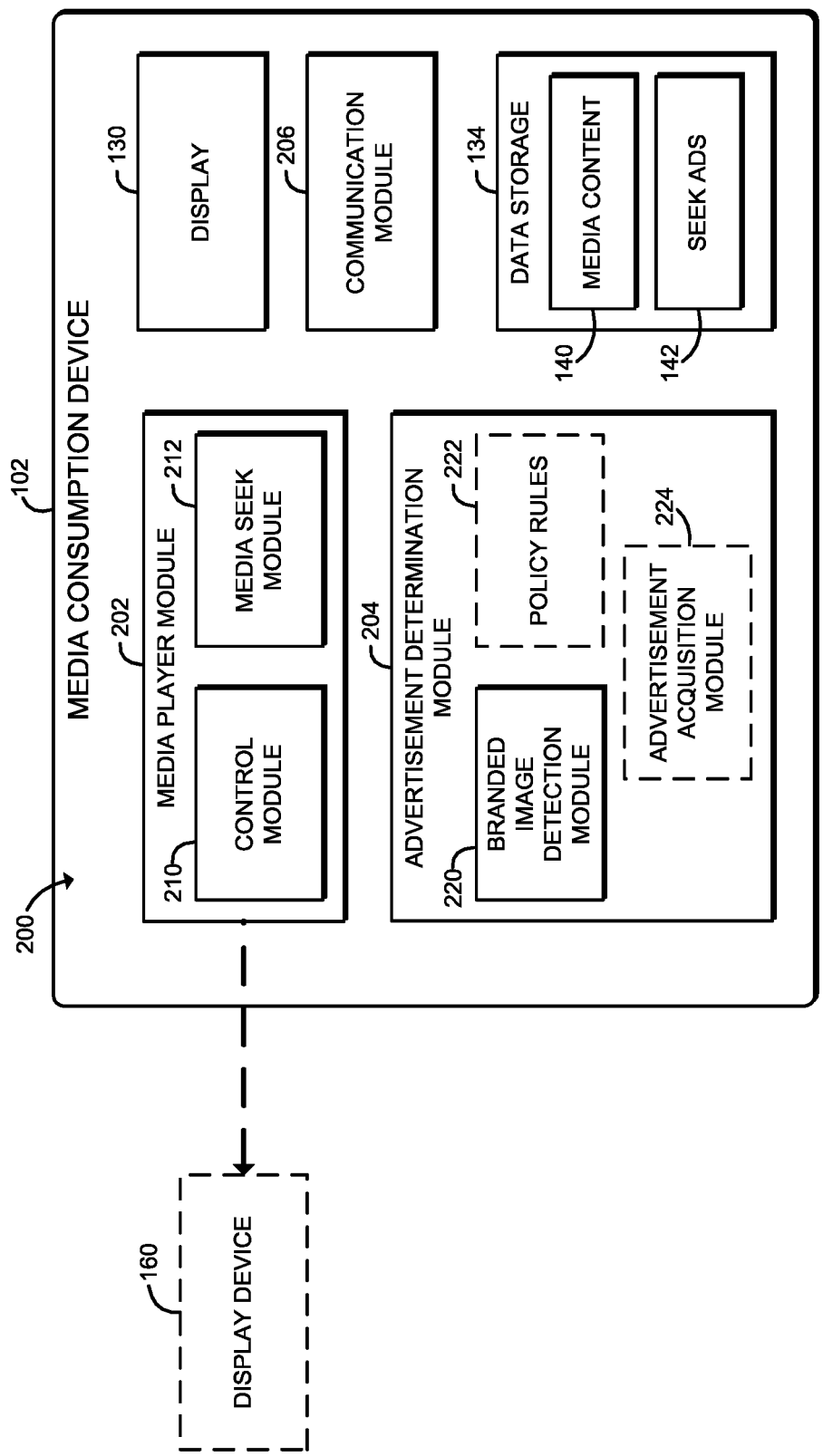
FIG. 2 is a simplified block diagram of at least one embodiment of an environment of a media consumption device of the system of FIG. 1.

Referring now to FIG. 2, in use, the media consumption device 102 establishes an environment 200. The environment 200 includes a media player module 202, an advertisement determination module 204, and a communication module 206. Each of the media player module 202, the advertisement determination module 204, the communication module 206, and other modules of the environment 200 may be embodied as software, firmware, hardware, or any combination thereof.

The media player module 202 manages the playback and presentation of media content locally stored on the media player module 202 (e.g., the media content 140 stored in the data storage 134) and/or received from the remote media content distribution system 106 via the communication module 206 (e.g., streamed media content). The media player module 202 includes a control module 210 and a media seek module 212. The control module 210 facilitates user control of functionality of the media consumption device 102. For example, the control module 210 may provide a graphical user interface or otherwise be receptive to instructions received by a user (e.g., instructions received from a remote control) to perform one or more requested functions such as initiating playback of media content, retrieving new media content, deleting or modifying media content, and/or the like. However, any requested seeking functionality, such as fast-forwarding or rewinding of media content, is handled by the media seek module 212. For example, in some embodiments, the control module 210 may provide any requested media content seek to the media seek module 212 for handling as discussed below.

The media seek module 212 performs any requested seeking of the media content. For example, if the user has requested to fast-forward through a portion of the media content, the media seek module 212 performs the requested seek operation by advancing the media content at a reference or selected seek speed (e.g., a speed ten times the playback speed). In addition, if the media content though which the user is seeking includes a commercial, the media seek module 212 communicates with the advertisement determination module 204 to retrieve an advertisement, which the media player module 202 presents to the user while the media seek module is performing the requested seek of the associated commercial. For example, in some embodiments, a branded image extracted from the commercial itself is received from the advertisement determination module 204 and displayed on the display 130 and/or display device 160 during the performance of the requested seek function past the associated commercial. As discussed in more detail below, the branded image may include a brand, logo, slogan, or other trademark or indicia of the advertiser of the commercial such that advertiser's brand is displayed to the user during the seek operation and for the duration of the commercial being played at the seek speed.

The advertisement determination module 204 determines the advertisement that is to be displayed, or otherwise presented, to the user of the media consumption device 102 during the performance of a seek function on a commercial and communicates the advertisement to the media seek module 212 of the media player module 202. In the illustrative embodiment, the advertisement determination module 204 includes a branded image detection module 220, which is configured to analyze the commercial(s) that is being seeked past to determine an advertisement to be presented to the user. That is, the branded image detection module 220 attempts to locate or identify the brand, logo, phrase, or other trademark or indicia of the advertiser used in the commercial. To do so, as discussed in more detail below, the branded image detection module 220 may use one or more methods to determine and/or generate the advertisement. For example, in some embodiments, the branded image detection module 220 may analyze the commercial to identify consecutive frames of the commercial that are identical or substantially similar and select one of those frames as the branded image. In such embodiments, it is acknowledged that may advertisers display their logo or brand image for some consecutive period of time during the commercial. Additionally or alternatively, the branded image detection module 220 may select a frame of the commercial occurring at a specific point in time. For example, the branded image detection module 220 may select a frame that occurs at a specific point in time prior to the end of the commercial. In such embodiments, it is acknowledged that many advertisers display their brand, logo, phrase, or other trademark or indicia toward the end of the commercial and, generally, display such branding for some period of time.

In some embodiments, the branded image detection module 220 may perform an image recognition analysis procedure on the commercial to identify the branded image. In such embodiments, the branded image detection module 220 may utilize a policy rule set 222 of the advertisement determination module 204. The policy rule set 222 includes a set of rules usable by the branded image detection module 220 to identify the brand image, logo, slogan, or other trademark of the advertiser. For example, in some embodiments, the policy rule set 222 may include a copy of brand images, logos, slogans, or other trademarks of various advertisers, which are compared to the frames or portions of the commercial to identify the advertiser's branded image. Of course, other policies and rules may be used in other embodiments.

In some embodiments, the advertisement determination module 204 may include an advertisement acquisition module 224 in place of, or in addition to, the branded image detection module 220. The advertisement acquisition module 224 is configured to retrieve previously determined or generated seek advertisements. For example, as discussed in more detail below, the advertisement to be displayed or presented to the user during the performance of a requested seek function may be received in association with the media content as metadata or out-of-band information. In such embodiments, the advertisement determination module 204 may store such advertisements in the data storage 134 as seek advertisements 142. Alternatively, in some embodiments, the advertisement acquisition module 224 is configured to communicate with the remote media content distribution system 106 and/or the remote advertisement distribution system 110 to retrieve the seek advertisements 152 on an as-needed basis. In such embodiments, as discussed in more detail below, the remote media content distribution system 106 and/or the remote advertisement distribution system 110 are configured to determine, or otherwise generate, the seek advertisements. Such determination or generation of the seek advertisements by the systems 106, 110 may be performed prior to the distribution of any associated media content and commercials or may be performed in response to a request from the media consumption device 102.

Figure 3:
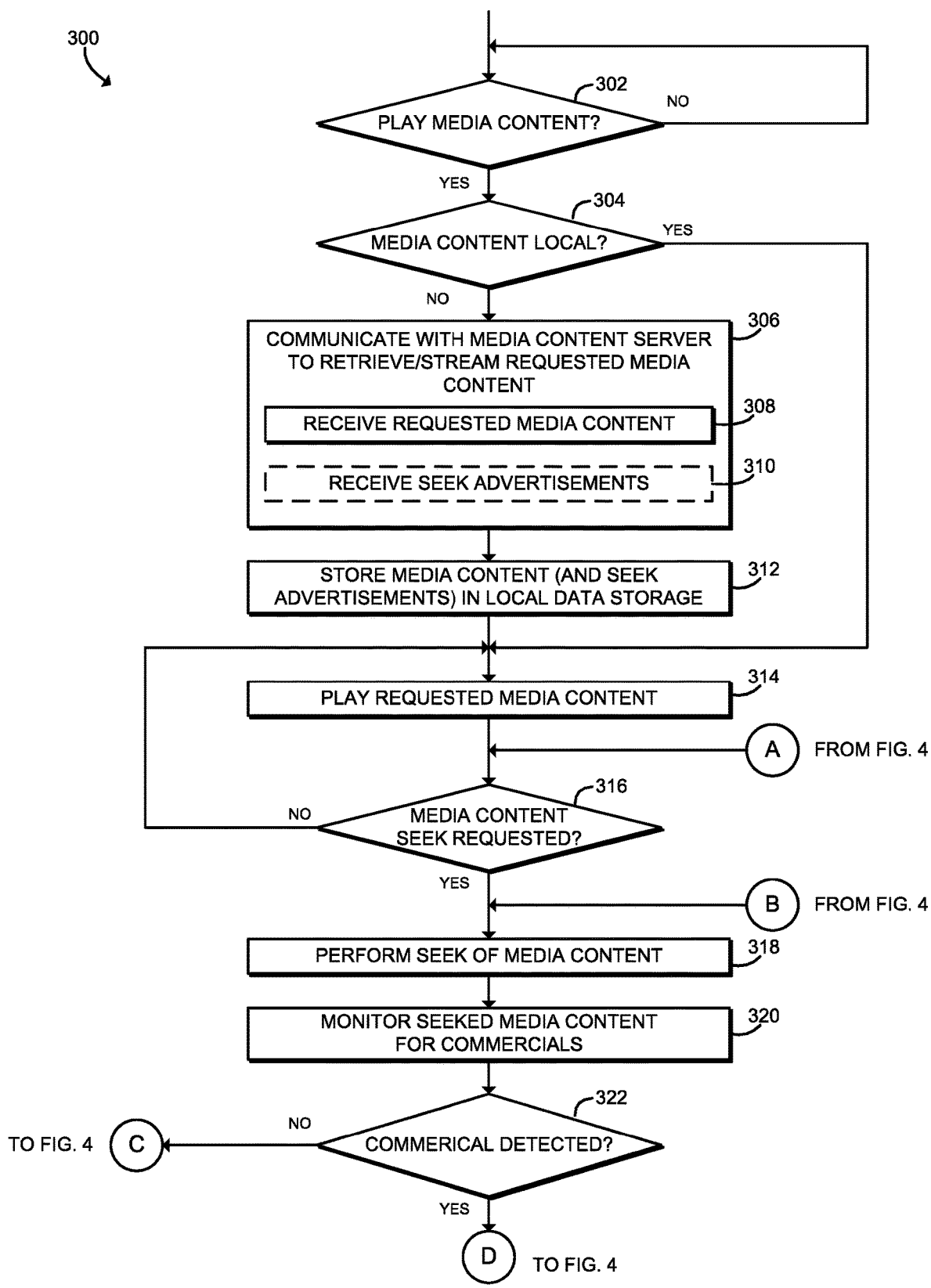
FIGS. 3 and 4 is a simplified flow diagram of at least one embodiment of a method for determining and displaying advertisements during a media content seek that may be executed by the media consumption device of FIGS. 1 and 2.
Figure 4:
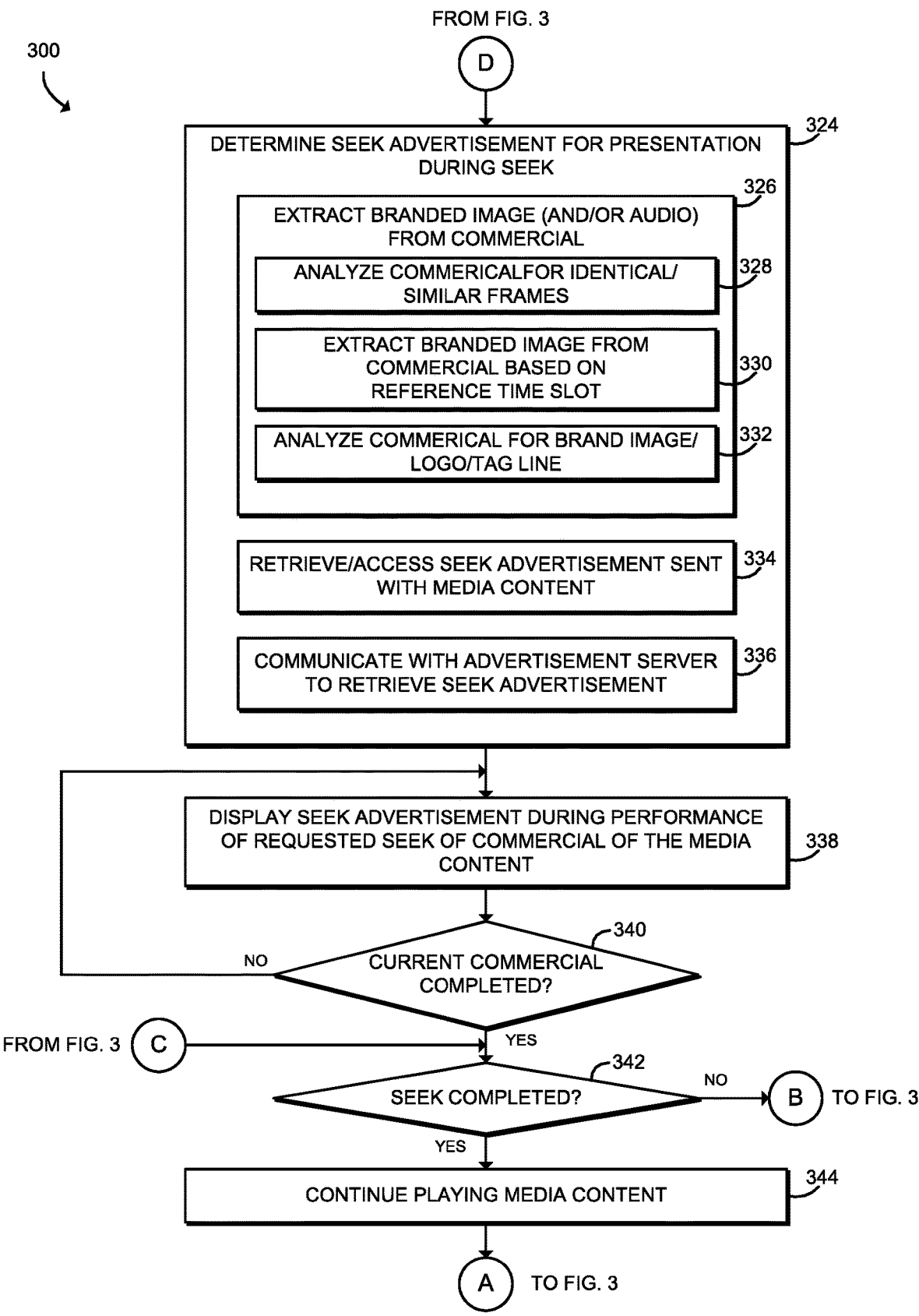

Referring now to FIGS. 3 and 4, in use, the media consumption device 102 may execute a method 300 for determining and displaying advertisements in response to a requested media content seek. The method 300 begins with block 302 in which the media consumption device 102 determines whether a user has requested to play media content. As discussed above, the media content may be stored locally or may be available from one or more of the remote media content distribution systems 106 (e.g., streaming or live content). If the user has requested play of media content, the method 300 advances to block 304 in which the media consumption device 102 determines whether the requested media is stored locally on the media consumption device 102. For example, the requested media content may be stored in the data storage 134 as media content 140. If so, the method 300 advances to block 314 in which the media consumption device 102 retrieves the requested media content and begins play of the retrieved media content as discussed in more detail below.

However, if the requested media content is stored on, or otherwise available from the remote media content distribution system 106, the method 300 advances to block 306. In block 306, the media consumption device 102 communicates with the remote media content distribution system 106 from which the requested media content is available to retrieve the requested media content. In block 308, the media consumption device 102 receives the requested media content from the remote media content distribution system 106. As discussed above, the media content may be received as downloaded content or streamed content from the remote media content distribution system 106. Additionally, in some embodiments, the media consumption device 102 also receives one or more seek advertisements in block 310. As discussed above, the remote media content distribution system 106 and/or the remote advertisement distribution system 110 may determine or generate the advertisements to be presented to the user of the media consumption device 102 during performance of a requested media content seek. In such embodiments, the pre-determined or pre-generated advertisements may be received in block 310 in association with the media content (i.e., the commercials included in the media content) received in block 308. Subsequently, in block 312, the media consumption device 102 stores the received media content, and any received seek advertisements, in the data storage 134.

In block 314, the media player module 202 of the media consumption device 102 begins play of the requested media content. Again, as discussed above, the media content may be embodied as previously recorded or stored media content, media content downloaded from a remote media content distribution system 106, media content streamed from a remote media content distribution system 106, or other type of media content. During the play of the media content, the media player module 202 monitors for commands received from the user of the media consumption device 102 and responds to any received commands. In particular, in block 316, the media player module 202 monitors for any media content seek command. If no media content seek command is received from the user, the method 300 loops back to block 314 in which the media player module 202 continues to play the media content (and respond to other user commands such as volume control commands and/or change channel commands).

However, if the media player module 202 determines that the user has requested a media content seek (e.g., to fast-forward the media content), the method 300 advances to block 318 in which the requested seek function is performed. That is, in block 318, the media player module 202 begins advancing (e.g., fast-forwarding) or rewinding the media content at a higher frame rate than the frame rate of normal playback. Because a user may request the media content seek at any time during the play of the media content (e.g., during playback of the core content such as a television show or at the initiation of or during a commercial included in the media content), the media player module 202 monitors for commercials included in the media content during the performance of the requested media content seek in block 320. The media player module 202 may utilize any suitable methodology for determining the presence of a commercial in the seeked media content. For example, in some embodiments, the media player module 202 may analyze metadata of the media content, which may indicate the beginning or presence of a commercial. Alternatively, the media player module 202 may analyze the individual frames of the seeked media content for transitions indicative of a commercial.

If no commercial is detected in the seeked media content, the method 300 advances to block 344 (see FIG. 4) discussed below. However, if the media player module 202 detects a commercial in the seeked media content, the method 300 advances to block 324 (see FIG. 4). In block 324, the advertisement determination module 204 of the media player module 202 determines an advertisement to be presented to the user of the media consumption device 102 during the performance of the requested seek function (i.e., while the media content is being fast-forwarded or rewound). To do so, the advertisement determination module 204 may use any suitable methodology to determine or generate the advertisement.

For example, in some embodiments, the advertisement determination module 204 may extract a branded image or audio snippet from the commercial itself (i.e., the commercial currently being seeked past) in block 326. To do so, advertisement determination module 204 may analyze the commercial for identical or substantially similar video frames in block 328. In typical commercials, an advertiser often displays their brand, logo, slogan, trademark, or other company indicia for some period of time during the commercial. For example, the ending frames of an illustrative commercial are shown in FIGS. 6A-6F. Frames 6A and 6B show the ending frames of the commercial content, which depicts an athlete running. Frames 6C-6E are identical to each other and show the company's or brand's logo and brand slogan. The commercial is completed and ends in Frame 6F. In the illustrative commercial of FIGS. 6A-6F, the company's logo and brand slogan are shown in three consecutive frames of the commercial. In such embodiments, the advertisement determination module 204 may extract (i.e., copy) one of the identical or substantially similar frames 6C, 6D, or 6E and use the frame as the seek advertisement for display to the user during the performance of the requested seek as discussed below.

Additionally or alternatively, in some embodiments, the advertisement determination module 204 may determine or generate the seek advertisement by selecting a frame of the commercial based on a reference time slot. For example, the advertisement determination module 204 may extract (i.e., copy) the frame of the commercial occurring at a reference point in time prior to the end of the commercial, which is used as the seek advertisement. In one particular embodiment, the advertisement determination module 204 may extract the frame or frames of the commercial occurring at approximately two seconds prior to the end of the commercial, which is used as the seek advertisement. Of course, other reference points in time of the commercial may be used in other embodiments. Additionally, in some embodiments, the reference point in time may be learned or modified over time. The advertisement determination module 204 may detect the end of the commercial (or other portion thereof) using any suitable methodology such as the metadata associated with the commercial, analysis of the commercial and/or content transitions, and/or other detection methodologies.

In some embodiments, the advertisement determination module 204 may determine or generate the seek advertisement based on an analysis of the commercial itself. For example, in block 332, the advertisement determination module 204 may analyze the commercial for images of brands, logos, slogans, or other company or brand indicia. To do so, in some embodiments, the advertisement determination module 204 utilizes the policy rules 222 to identify a frame of the commercial including the branded images. For example, in some embodiments, the policy rules 222 may include copies of the brands, logos, slogans, or other company or brand indicia, which may be embodied as visual and/or audio data. In such embodiments, the advertisement determination module 204 may analyze the frames of the commercial using the policy rules 222 and an image or sound recognition analysis to identify a frame and/or audio portion of the commercial including the company's or brand's logo, slogan, or other indicia. Once identified, the advertisement determination module 204 may extract (i.e., copy) the identified frame, which is used as the seek advertisement.

As discussed above, in some embodiments, the advertisement to be presented to the user during the performance of the requested seek of a commercial may be determined, or otherwise generated, by a device other than the media consumption device 102 such as the remote media content distribution system 106 or the remote advertisement distribution system 110. In such embodiments, the seek advertisement may have been previously received and stored by the media consumption device 102. If so, the advertisement determination module 204 may retrieve or access the pre-generated advertisement in block 334. For example, the advertisement determination module 204 may retrieve the advertisement from the seek advertisements 142 stored in the data storage 134. In such embodiments, the advertisement determination module 204 may maintain a table or other data structure to cross-reference the commercials of the played media content to the advertisements stored in the data storage 134. Additionally or alternatively, in some embodiments, each commercial may include metadata that provides an indication of which advertisement corresponds to that particular commercial.

Additionally, in some embodiments, the advertisement determination module 204 may communicate with the remote media content distribution system 106 and/or the remote advertisement distribution system 110 to determine and retrieve the seek advertisement in block 336. In such embodiments, the remote media content distribution system 106 and/or the remote advertisement distribution system 110 may have previously generated, or generate upon request, the requested advertisements using one or more of the methods discussed above in regard to block 326. Additionally, as discussed above, the particular advertisement to be retrieved from the remote media content distribution system 106 and/or the remote advertisement distribution system 110 may be based on metadata associated with the particular commercial, a cross-reference data structure maintained by the media consumption device 102, or via another methodology.

After the advertisement determination module 204 has determined and obtained the seek advertisement in block 324, the method 300 advances to block 338 in which the determined seek advertisement (e.g., a copied frame of the commercial) is presented to the user while the media consumption device 102 contemporaneously performs the requested media content seek function. For example, if a user requested to seek (e.g., fast forward) past a commercial included in the media content, the media consumption device 102 performs the requested seek and displays the determined seek advertisement to the user while the commercial is being seeked past. In this way, the advertiser of the commercial is ensured that the user is exposed to the advertiser's brand, logo, slogan, or other company/brand indicia captured in the determined advertisement, even though the user may not view the entire commercial. Of course, depending on the type of media content being consumed, the advertisement may be presented in various forms to the user. For example, in embodiments in which the media content is visual media content, such as a show or movie, the advertisement may be displayed to the user on the display 130 or display device 160 during the performance of the associated seek function. Alternatively, in embodiments in which the media content is only audio media content, the advertisement may be embodied as an audio snippet played to the user.

In block 340, the media consumption device 102 determines whether the current commercial that is being seeked past has completed. If not, the method 300 loops back to block 338 in which the media consumption device 102 continues to present the determined advertisement to the user while the media content continues to perform the requested seek function. However, if the current commercial is determined to be complete, the method 300 advances to block 342 in which the media consumption device 102 determines whether the user desires to continue seeking through the media content. If so, the method 300 loops back to block 318 (see FIG. 3) in which the media consumption device 102 continues to perform the requested seek function and monitor for commercials in the seeked media content. Alternatively, if the user has ended the seek function in block 342, the method 300 advances to block 344 in which the media consumption device 102 continues to play the media content at the normal frame rate. The method 300 subsequently advances to block 316 in which the media consumption device 102 again monitors for a request from the user to seek past media content.

Although the determination, generation, and/or retrieval of the advertisement that is to be presented to the user during the performance of a requested seek through a commercial of the media content has been described above as occurring contemporaneously with or in response to the user's command to perform the seek function, it should be appreciated that such determination may occur at the start of or prior to the playback of the media content. Additionally, in some embodiments such as those embodiments in which the media content is streamed, the presentation of the media content to the user may be delayed slightly (e.g., cached) to allow the media consumption device 102 to determine, generate or retrieve the associated advertisements in anticipation of a requested seek function by the user. That is, the media consumption device 102 may "look ahead" in the played media content for upcoming commercials and determine the appropriate seek advertisement to present to the user in the event the user requests to seek past the associated commercial(s).

Figure 5:
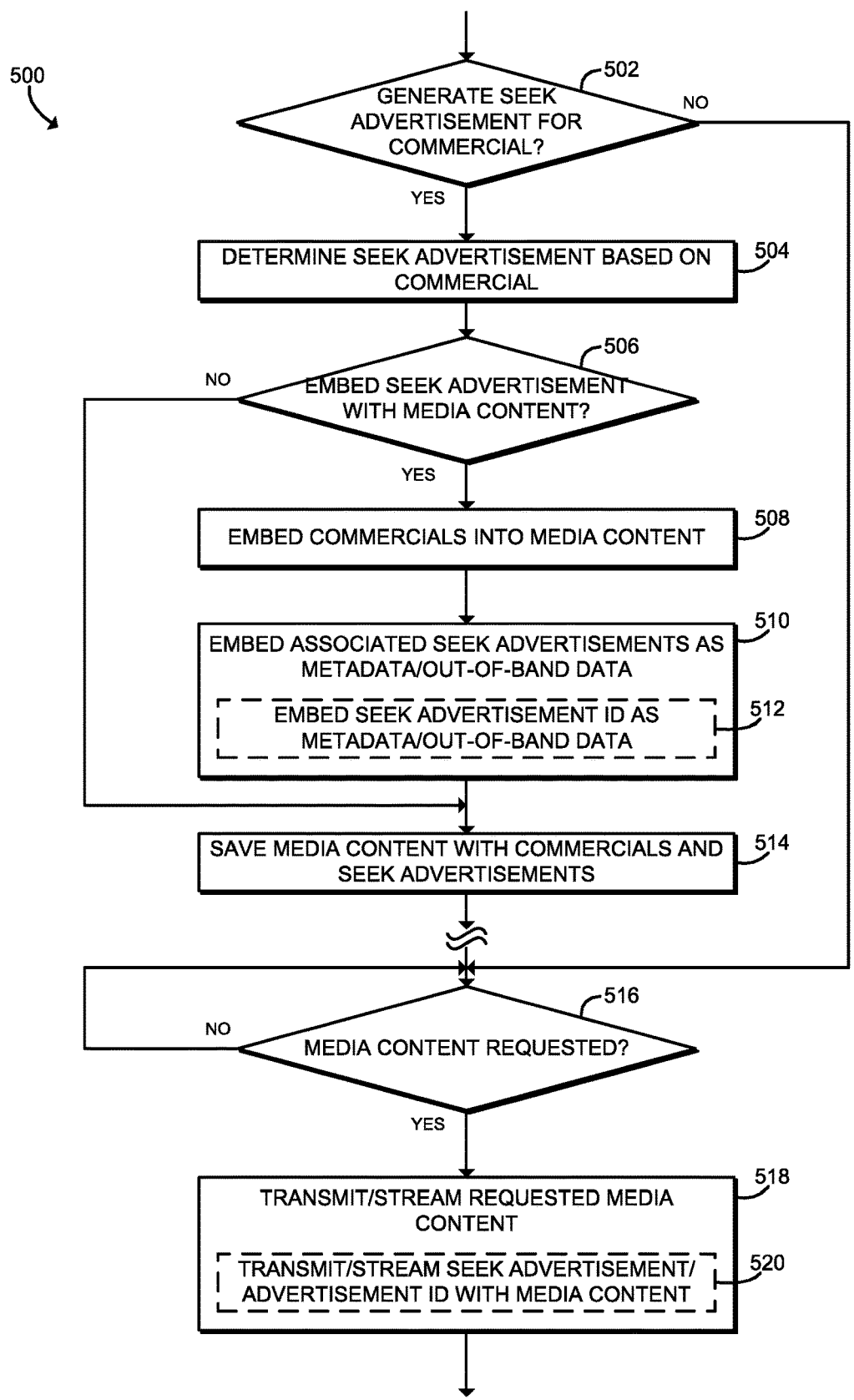
FIG. 5 is a simplified flow diagram of at least one embodiment of a method for generating and distributing a seek advertisement that may be executed by a media content distribution system of the system of FIG. 1.

Referring now to FIG. 5, as discussed above, the remote media content distribution system 106 may determine or generate the seek advertisement in some embodiments. In such embodiments, the remote media content distribution system 106 may execute a method 500 for generating and distributing seek advertisements in association with the media content. The method 500 begins with block 502 in which the remote media content distribution system 106 determines whether to generate a seek advertisement for a particular commercial. If not, the method 500 advances to block 516 discussed below. However, if the remote media content distribution system 106 determines to generate a seek advertisement in block 502, the method 500 advances to block 504 in which the remote media content distribution system 106 determines a seek advertisement based on the particular commercial. To do so, the remote media content distribution system 106 may perform any one or more of the advertisement determination methods discussed above with regard to block 326 of the method 300. For example, the remote media content distribution system 106 may analyze the commercial for consecutive, identical/similar frames and extract (i.e., copy) one of those frames to be used as the seek advertisement. Additionally or alternately, the remote media content distribution system 106 may extract a frame of the commercial for use as the seek advertisement based on a reference point in time prior to the end of the commercial. Further, the remote media content distribution system 106 may analyze the commercial using an image or audio recognition analysis to identify a frame or portion of the commercial including a brand, logo, slogan, or other indicia of the advertiser as discussed above.

After the remote media content distribution system 106 has determined the seek advertisement for the particular commercial in block 504, the method 500 advances to block 506 in which the remote media content distribution system 106 determines whether to embed the determined seek advertisement with the media content. If not, the method 500 advances to block 514. However, if the remote media content distribution system 106 is to embed the seek advertisement, the method 500 advances to block 508 in which the associated commercial(s) are embedded or otherwise included in the media content (e.g., the commercials may be embedded in a television show having pre-defined slots for advertisements). Subsequently, in block 510, the remote media content distribution system 106 embeds the seek advertisement into the media content. To do so, the remote media content distribution system 106 may attached the seek advertisement to the media content as metadata or other out-of-band data such that the seek advertisement is received by the media consumption device 102 along with the media content. In such embodiments, the seek advertisements are embedded in a manner such that the association between the seek advertisement and the corresponding commercial can be determined by the media consumption device 102 (e.g., via temporal association). In some embodiments, the remote media content distribution system 106 may embed an advertisement identification into the media content, rather than the advertisement itself, in block 512. In such embodiments, the media consumption device 102 may retrieve the advertisement using the advertisement identification when the advertisement is needed.

In block 512, the remote media content distribution system 106 saves the media content including the embedded commercials and the determined/generated seek advertisements in a local data storage. Subsequently, in block 516, the remote media content distribution system 106 determines whether the media consumption device 102 has requested any media content. If so, the method 500 advances to block 518 in which the remote media content distribution system 106 transmits (e.g., streams) the requested media content to the media consumption device 102. In addition to the media content, the remote media content distribution system 106 may transmit or stream the seek advertisement or seek advertisement identification in association with requested media content in block 520. In this way, the media consumption device 102 receives the media content along with the seek advertisements (or seek advertisement identifications) corresponding to commercials included in the media content

EXAMPLES

Illustrative examples of the technologies disclosed herein are provided below. An embodiment of the technologies may include any one or more, and any combination of, the examples described below.

Example 1 includes a media consumption device for presenting an advertisement to a user, the media consumption device comprising a media player module to play media content including a commercial and an advertisement determination module to determine an advertisement based on the commercial, wherein the media player module is to receive a request from the user to seek past the commercial and present the advertisement to the user during performance of the requested seek past the commercial.

Example 2 includes the subject matter of Example 1, and wherein to play the media content comprises to display the media content on a display, and wherein to present the advertisement to the user comprises to display the advertisement on the display.

Example 3 includes the subject matter of any of Examples 1 or 2, and wherein the media player module is to receive the request to seek past the commercial while playing the media content.

Example 4 includes the subject matter of any of Examples 1-3, and wherein the advertisement determination module is to search the media content for the commercial, and wherein to determine the advertisement comprises to determine the advertisement in response to identification of the commercial in the media content.

Example 5 includes the subject matter of any of Examples 1-4, and wherein to determine the advertisement comprises to extract a branded image from the commercial, and to present the advertisement comprises to display the branded image on a display during performance of the requested seeking past the commercial.

Example 6 includes the subject matter of any of Examples 1-5, and wherein to extract the branded image comprises to select an image included in the commercial.

Example 7 includes the subject matter of any of Examples 1-6, and wherein to extract the branded image comprises to analyze the commercial to identify identical consecutive frames of the commercial, and to select one of the identical consecutive frames as the branded image.

Example 8 includes the subject matter of any of Examples 1-7, and wherein to extract the branded image comprises to select a frame from the commercial based on a reference time slot at which the frame occurs.

Example 9 includes the subject matter of any of Examples 1-8, and wherein to select the frame from the commercial comprises to identify the end of the commercial, and to select a frame of the commercial that occurs at a reference point in time prior to the end of the commercial.

Example 10 includes the subject matter of any of Examples 1-9, and wherein to select the frame of the commercial that occurs at a reference point in time prior to the end of the commercial comprises to select a frame of the commercial that occurs two seconds prior to the end of the commercial.

Example 11 includes the subject matter of any of Examples 1-10, and wherein to extract the branded image comprises to analyze the commercial for a logo or phrase associated with product or service advertised in the commercial, and display the branded image comprises to display the logo or phrase during performance of the requested seeking past the commercial.

Example 12 includes the subject matter of any of Examples 1-11, and wherein to extract the branded image comprises to identify a logo or phrase associated with a product or service advertised in the commercial based on a set of policy rules, wherein the set of policy rules includes the identified logo or phrase.

Example 13 includes the subject matter of any of Examples 1-12, and wherein to identify the logo or phrase associated with the product or service advertised in the commercial comprises to perform an image recognition analysis on at least one frame of the commercial.

Example 14 includes the subject matter of any of Examples 1-13, and wherein the advertisement comprises an advertisement received by the media consumption device as out-of-band information associated with the media content.

Example 15 includes the subject matter of any of Examples 1-14, and wherein the advertisement comprises an advertisement received by the media consumption device as metadata of the media content.

Example 16 includes the subject matter of any of Examples 1-15, and wherein to determine the advertisement comprises to communicate with a media content distribution system to retrieve the advertisement.

Example 17 includes the subject matter of any of Examples 1-16, and wherein the media content player is further to determine whether the commercial is completed during performance of the requested seek past the commercial, and to terminate the presentation of the advertisement in response to a determination that the commercial is completed.

Example 18 includes the subject matter of any of Examples 1-17, and wherein the media content player is further to continue play of the media content after termination of the presentation of the advertisement.

Example 19 includes the subject matter of any of Examples 1-18, and wherein the media content player comprises one of a digital video recorder, a television, or a mobile computing device.

Example 20 includes a method for presenting an advertisement on a media consumption device, the method comprising playing, by a media consumption device, media content including a commercial; receiving, by the media consumption device, a request to seek past the commercial from a user of the media consumption device; determining, by the media consumption device, an advertisement based on the commercial; and presenting, by the media consumption device, the advertisement to the user while performing the requested seeking past the commercial.

Example 21 includes the subject matter of Example 20, and wherein playing media content comprises displaying the media content on a display, and presenting the advertisement comprises displaying the advertisement on the display.

Example 22 includes the subject matter of Example 20 or 21, and wherein receiving the request comprises receiving the request to seek past the commercial while playing the media content.

Example 23 includes the subject matter of any of Examples 20-22, and further comprising searching the media content for the commercial, and wherein determining the advertisement comprises determining the advertisement in response to locating the commercial in the media content.

Example 24 includes the subject matter of any of Examples 20-23, and wherein determining the advertisement comprises extracting a branded image from the commercial, and presenting the advertisement comprises displaying the branded image on a display while performing the requested seeking past the commercial.

Example 25 includes the subject matter of any of Examples 20-24, and wherein extracting the branded image comprises selecting an image included in the commercial.

Example 26 includes the subject matter of any of Examples 20-25, and wherein extracting the branded image comprises analyzing the commercial to identify identical consecutive frames of the commercial, and selecting one of the identical consecutive frames as the branded image.

Example 27 includes the subject matter of any of Examples 20-26, and wherein extracting the branded image comprises selecting a frame from the commercial based on a reference time slot at which the frame occurs.

Example 28 includes the subject matter of any of Examples 20-27, and wherein selecting the frame from the commercial comprises identifying the end of the commercial, and selecting a frame of the commercial that occurs at a reference point in time prior to the end of the commercial.

Example 29 includes the subject matter of any of Examples 20-28, and wherein selecting the frame comprises selecting a frame of the commercial that occurs two seconds prior to the end of the commercial.

Example 30 includes the subject matter of any of Examples 20-29, and wherein: extracting the branded image comprises analyzing the commercial for a logo or phrase associated with product or service advertised in the commercial, and displaying the branded image comprises displaying the logo or phrase while performing the requested seeking past the commercial.

Example 31 includes the subject matter of any of Examples 20-30, and wherein extracting the branded image comprises identifying a logo or phrase associated with a product or service advertised in the commercial based on a set of policy rules, wherein the set of policy rules includes the identified logo or phrase.

Example 32 includes the subject matter of any of Examples 20-31, and wherein identifying the logo or phrase associated with the product or service advertised in the commercial comprises performing an image recognition analysis on at least one frame of the commercial.

Example 33 includes the subject matter of any of Examples 20-32, and wherein determining the advertisement comprises accessing an advertisement received by the media consumption device as out-of-band information associated with the media content.

Example 34 includes the subject matter of any of Examples 20-33, and wherein accessing the advertisement comprises accessing an advertisement received, by the media consumption device, as metadata of the media content.

Example 35 includes the subject matter of any of Examples 20-34, and wherein determining the advertisement comprises communicating with a media content distribution system to retrieve the advertisement.

Example 36 includes the subject matter of any of Examples 20-35, and further comprising determining whether the commercial is completed while seeking past the commercial, and terminating the presentation of the advertisement in response to determining that the commercial is completed.

Example 37 includes the subject matter of any of Examples 20-36, and further comprising continue the playing of the media content after terminating the presentation of the advertisement.

Example 38 includes the subject matter of any of Examples 20-37, and wherein playing the media content comprises playing the media content via one of a digital video recorder, a television, or a mobile computing device.

Example 39 includes one or more machine readable storage media comprising a plurality of instructions stored thereon that in response to being executed result in a media consumption device performing the method of any of Examples 20-38.

Example 40 includes a media consumption device comprising means for performing the method of any of Examples 20-38.

Example 41 includes a media content distribution system to deliver media content to a media consumption device, the media content distribution system comprising an advertisement determination module to (i) extract a branded image from a commercial, (ii) embed the commercial in media content, and (iii) associate the extracted branded image with the embedded commercial; and a communication module to transmit the media content, including the commercial and the branded image, to the media consumption device in response to receipt of a request for the media content.

Example 42 includes the subject matter of Examples 41, and wherein to extract the branded image comprises to select an image included in the commercial.

Example 43 includes the subject matter of Examples 40 or 41, and wherein to extract the branded image comprises to analyze the commercial to identify identical consecutive frames of the commercial, and to select one of the identical consecutive frames as the branded image.

Example 44 includes the subject matter of any of Examples 40-43, and wherein to extract the branded image comprises to select a frame from the commercial based on a reference time slot at which the frame occurs.

Example 45 includes the subject matter of any of Examples 40-44, and wherein to select the frame from the commercial comprises to identify the end of the commercial, and to select a frame of the commercial that occurs at a reference point in time prior to the end of the commercial.

Example 46 includes the subject matter of any of Examples 40-45, and wherein to extract the branded image comprises to analyze the commercial for a logo or phrase associated with product or service advertised in the commercial, and to associate the branded image comprises to associate the logo or phrase with the embedded commercial.

Example 47 includes the subject matter of any of Examples 40-46, and wherein extract the branded image comprises to identify a logo or phrase associated with a product or service advertised in the commercial based on a set of policy rules, wherein the set of policy rules includes the identified logo or phrase.

Example 48 includes the subject matter of any of Examples 40-47, and wherein to transmit the media content comprises to transmit the branded image as metadata associated with the media content.

Example 49 includes the subject matter of any of Examples 40-48, and wherein to transmit the media content comprises to transmit the branded image as out-of-band data associated with the media content.

Example 50 includes a method for delivering media content from a media content distribution system to a media consumption device, the method comprising analyzing a commercial to extract a branded image from the commercial; embedding the commercial in media content; associating the branded image with the embedded commercial; and transmitting the media content, including the commercial and the branded image, to a media consumption device in response to a receiving a request for the media content.

Example 51 includes the subject matter of Example 50, and wherein analyzing the commercial comprises selecting an image included in the commercial.

Example 52 includes the subject matter of Examples 50 or 51, and wherein analyzing the commercial comprises analyzing the commercial to identify identical consecutive frames of the commercial, and selecting one of the identical consecutive frames as the branded image.

Example 53 includes the subject matter of any of Examples 50-52, and wherein analyzing the commercial comprises selecting a frame from the commercial based on a reference time slot at which the frame occurs.

Example 54 includes the subject matter of any of Examples 50-53, and wherein selecting the frame from the commercial comprises identifying the end of the commercial, and selecting a frame of the commercial that occurs at a reference point in time prior to the end of the commercial.

Example 55 includes the subject matter of any of Examples 50-54, and wherein analyzing the commercial comprises analyzing the commercial for a logo or phrase associated with product or service advertised in the commercial, and associating the branded image comprises associating the logo or phrase with the embedded commercial.

Example 56 includes the subject matter of any of Examples 50-55, and wherein analyzing the commercial comprises identifying a logo or phrase associated with a product or service advertised in the commercial based on a set of policy rules, wherein the set of policy rules includes the identified logo or phrase.

Example 57 includes the subject matter of any of Examples 50-56, and wherein transmitting the media content comprises transmitting the branded image as metadata associated with the media content.

Example 58 includes the subject matter of any of Examples 50-57, and wherein transmitting the media content comprises transmitting the branded image as out-of-band data associated with the media content.

Example 59 includes one or more machine readable storage media comprising a plurality of instructions stored thereon that in response to being executed result in a media content distribution system performing the method of any of Examples 50-58.

Example 60 includes media content distribution system comprising means for performing the method of any of Example 50-58.

The invention claimed is:

1. A data server of a media content distribution system, wherein the media content distribution system comprises a plurality of additional data servers connected by a network, wherein the data server is connected to a media consumption device and the plurality of additional data servers by the network, the data server comprising:
   a processor; and
   a memory coupled to the processor;
   the processor being configured to:
      identify, based on extraction analysis of a single commercial of media content, a plurality of non-identical substantially similar frames within the single commercial, each of the identified plurality of non-identical substantially similar frames within the single commercial including a same image;
      extract one or more frames of the plurality of non-identical substantially similar frames within the single commercial; and
      transmit the media content, including the commercial and an indication of the extracted one or more frames of the plurality of non-identical substantially similar frames within the single commercial, to the media consumption device over the network in response to receipt of a request for the media content.

2. The data server of claim 1, wherein the processor is further configured to stream the media content from one of the plurality of additional data servers and stream the media content to the media consumption device.

3. The data server of claim 1, wherein the processor is further configured to:
   identify the plurality of non-identical substantially similar frames within the single commercial by performing extraction analysis of frames of the commercial at a reference time slot, and
   modify the reference time slot over time based on other media content.

4. The data server of claim 1, wherein the extraction analysis of the commercial comprises analyzing the commercial for a logo or phrase associated with a product or service advertised in the commercial, and wherein extracting the one or more frames of the plurality of non-identical substantially similar frames within the single commercial comprises selecting the one or more frames of the plurality of non-identical substantially similar frames within the single commercial based on inclusion of the logo or phrase.

5. The data server of claim 1, wherein identifying the plurality of non-identical substantially similar frames within the single commercial comprises selecting the plurality of non-identical substantially similar frames within the single commercial based on a reference time slot at which a frame of the plurality of non-identical substantially similar frames within the single commercial occurs.

6. The data server of claim 5, wherein extracting the one or more frames of the plurality of non-identical substantially similar frames within the single commercial comprises:
identifying the end of the commercial, and
selecting a frame of the plurality of non-identical substantially similar frames within the single commercial that occurs at a reference point in time prior to the end of the commercial.

7. The data server of claim 1, wherein the processor is further configured to:
search the media content for the commercial, and
determine an advertisement in response to identification of the commercial in the media content.

8. A system for media content distribution comprising a plurality of data servers connected by a network, wherein one data server of the plurality of data servers comprises:
a processor; and
a memory coupled to the processor;
the processor being configured to:
identify, based on extraction analysis of a single commercial of media content, a plurality of non-identical substantially similar frames within the single commercial, each of the identified plurality of non-identical substantially similar frames within the single commercial including a same image;
extract one or more frames of the plurality of non-identical substantially similar frames within the single commercial; and
transmit the media content, including the commercial and an indication of the extracted one or more frames of the plurality of non-identical substantially similar frames within the single commercial, to a media consumption device over the network in response to receipt of a request for the media content.

9. The system of claim 8, wherein the processor is further configured to stream the media content from another of the plurality of data servers and stream the media content to the media consumption device.

10. The system of claim 8, wherein the processor is further configured to:
identify the plurality of non-identical substantially similar frames within the single commercial by performing extraction analysis of frames of the commercial at a reference time slot, and
modify the reference time slot over time based on other media content.

11. The system of claim 8, wherein the extraction analysis of the commercial comprises analyzing the commercial for a logo or phrase associated with a product or service advertised in the commercial, and
wherein extracting the one or more frames of the plurality of non-identical substantially similar frames within the single commercial comprises selecting the one or more frames of the plurality of non-identical substantially similar frames within the single commercial based on inclusion of the logo or phrase.

12. The system of claim 8, wherein identifying the plurality of non-identical substantially similar frames within the single commercial comprises selecting the plurality of non-identical substantially similar frames within the single commercial based on a reference time slot at which a frame of the plurality of non-identical substantially similar frames within the single commercial occurs.

13. The system of claim 12, wherein extracting the one or more frames of the plurality of non-identical substantially similar frames within the single commercial comprises:
identifying the end of the commercial, and
selecting a frame of the plurality of non-identical substantially similar frames within the single commercial that occurs at a reference point in time prior to the end of the commercial.

14. The system of claim 8, wherein the processor is further configured to:
search the media content for the commercial, and
determine an advertisement in response to identification of the commercial in the media content.

15. A method for distributing media content by a data server of a media content distribution system, wherein the media content distribution system comprises a plurality of additional data servers connected by a network, wherein the data server is connected to a media consumption device and the plurality of additional data servers by the network, the method comprising:
identifying, by the data server, a plurality of non-identical substantially similar frames within a single commercial of media content based on extraction analysis of the commercial, each of the identified plurality of non-identical substantially similar frames within the single commercial including a same image;
extracting, by the data server, one or more frames of the plurality of non-identical substantially similar frames within the single commercial; and
transmitting, by the data server, the media content, including the commercial and an indication of the extracted one or more frames of the plurality of non-identical substantially similar frames within the single commercial, to the media consumption device over the network in response to receipt of a request for the media content.

16. The method of claim 15, further comprising streaming, by the data server, the media content from one of the plurality of additional data servers and streaming, by the data server, the media content to the media consumption device.

17. The method of claim 15, further comprising:
identifying, by the data server, the plurality of non-identical substantially similar frames within the single commercial by performing extraction analysis of frames of the commercial at a reference time slot; and
modifying, by the data server, the reference time slot over time based on other media content.

18. The method of claim 15, wherein the extraction analysis of the commercial comprises analyzing the commercial for a logo or phrase associated with a product or service advertised in the commercial, and
wherein extracting the one or more frames of the plurality of non-identical substantially similar frames within the single commercial comprises selecting the one or more frames of the plurality of non-identical substantially similar frames within the single commercial based on inclusion of the logo or phrase.

19. The method of claim 15, wherein identifying the plurality of non-identical substantially similar frames within the single commercial comprises selecting the plurality of non-identical substantially similar frames within the single commercial based on a reference time slot at which a frame of the plurality of non-identical substantially similar frames within the single commercial occurs.

20. The method of claim 19, wherein extracting the one or more frames of the plurality of non-identical substantially similar frames within the single commercial comprises:
   identifying the end of the commercial, and
   selecting a frame of the plurality of frames within the single commercial that occurs at a reference point in time prior to the end of the commercial.

21. The data server of claim 1, wherein the processor is further configured to identify the plurality of non-identical substantially similar frames within the single commercial by using sound recognition analysis.

22. The data server of claim 1, wherein identifying the plurality of non-identical substantially similar frames within the single commercial based on extraction analysis of the commercial, extracting the one or more frames of the plurality of non-identical substantially similar frames within the single commercial, and transmitting the media content are configured to be performed for each of a plurality of commercials of media content.

23. The system of claim 8, wherein identifying the plurality of non-identical substantially similar frames within the single commercial based on extraction analysis of the commercial, extracting the one or more frames of the plurality of non-identical substantially similar frames within the single commercial, and transmitting the media content are configured to be performed for each of a plurality of commercials of media content.

24. The method of claim 15, wherein identifying the plurality of non-identical substantially similar frames within the single commercial based on extraction analysis of the commercial, extracting the one or more frames of the plurality of non-identical substantially similar frames within the single_commercial, and transmitting the media content are configured to be performed for each of a plurality of commercials of media content.

25. The data server of claim 1, wherein the plurality of non-identical substantially similar frames within the single_commercial are identified by identifying the same image from each of the plurality of non-identical substantially similar frames within the single commercial.

26. The system of claim 8, wherein the plurality of non-identical substantially similar frames within the single commercial are identified by identifying the same image from each of the plurality of non-identical substantially similar frames within the single commercial.

27. The method of claim 15, wherein the plurality of non-identical substantially similar frames within the single commercial are identified by identifying the same image from each of the plurality of non-identical substantially similar frames within the single commercial.

28. The data server of claim 1, wherein the data server is configured to generate a seek advertisement including the same image from the extracted one or more frames for displaying during a seek function.

29. The system of claim 8, wherein the one data server is configured to generate a seek advertisement including the same image from the extracted one or more frames for displaying during a seek function.

30. The method of claim 15, wherein the data server is configured to generate a seek advertisement including the same image from the extracted one or more frames for displaying during a seek function.

* * * * *